Patented Apr. 10, 1928.

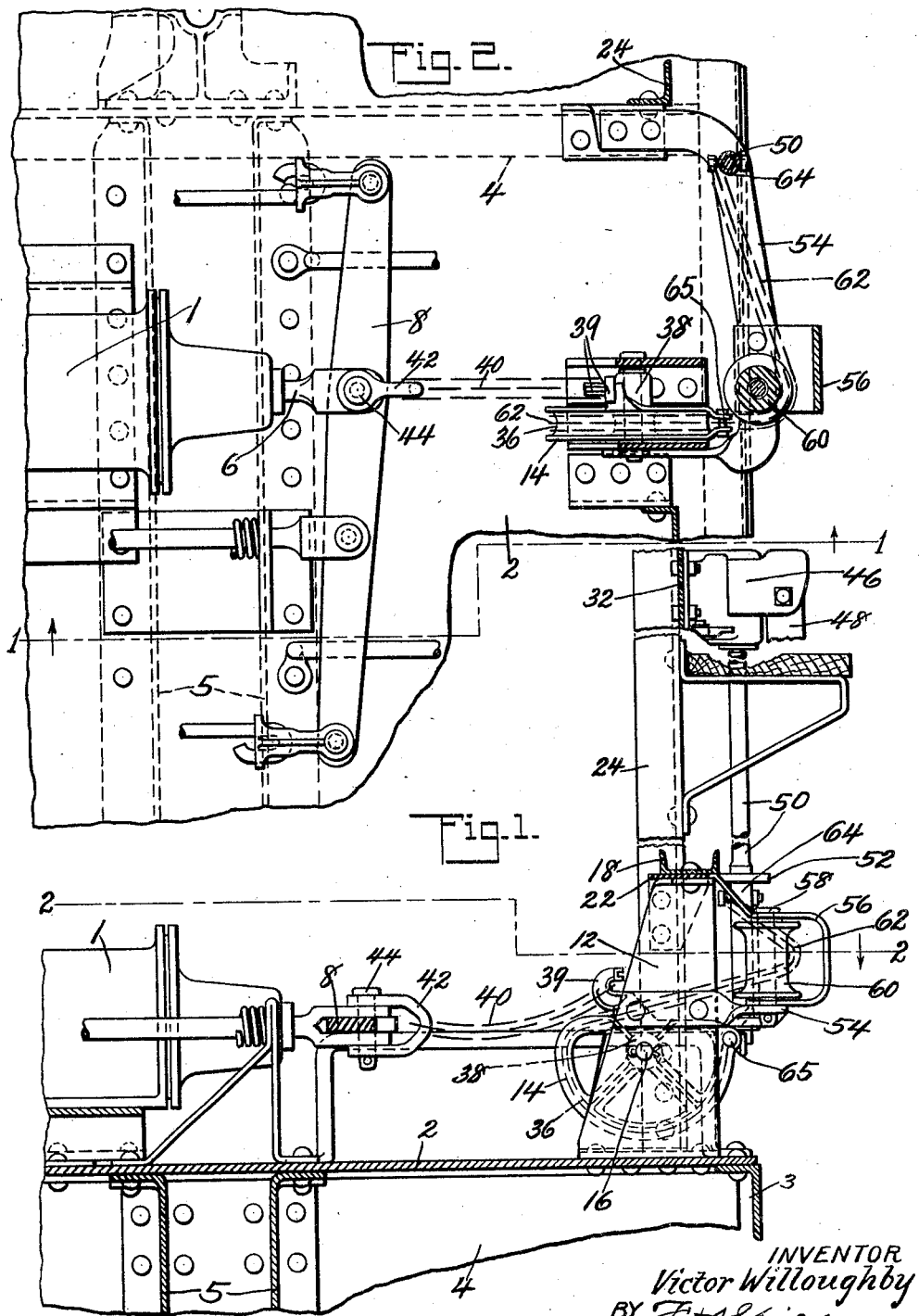

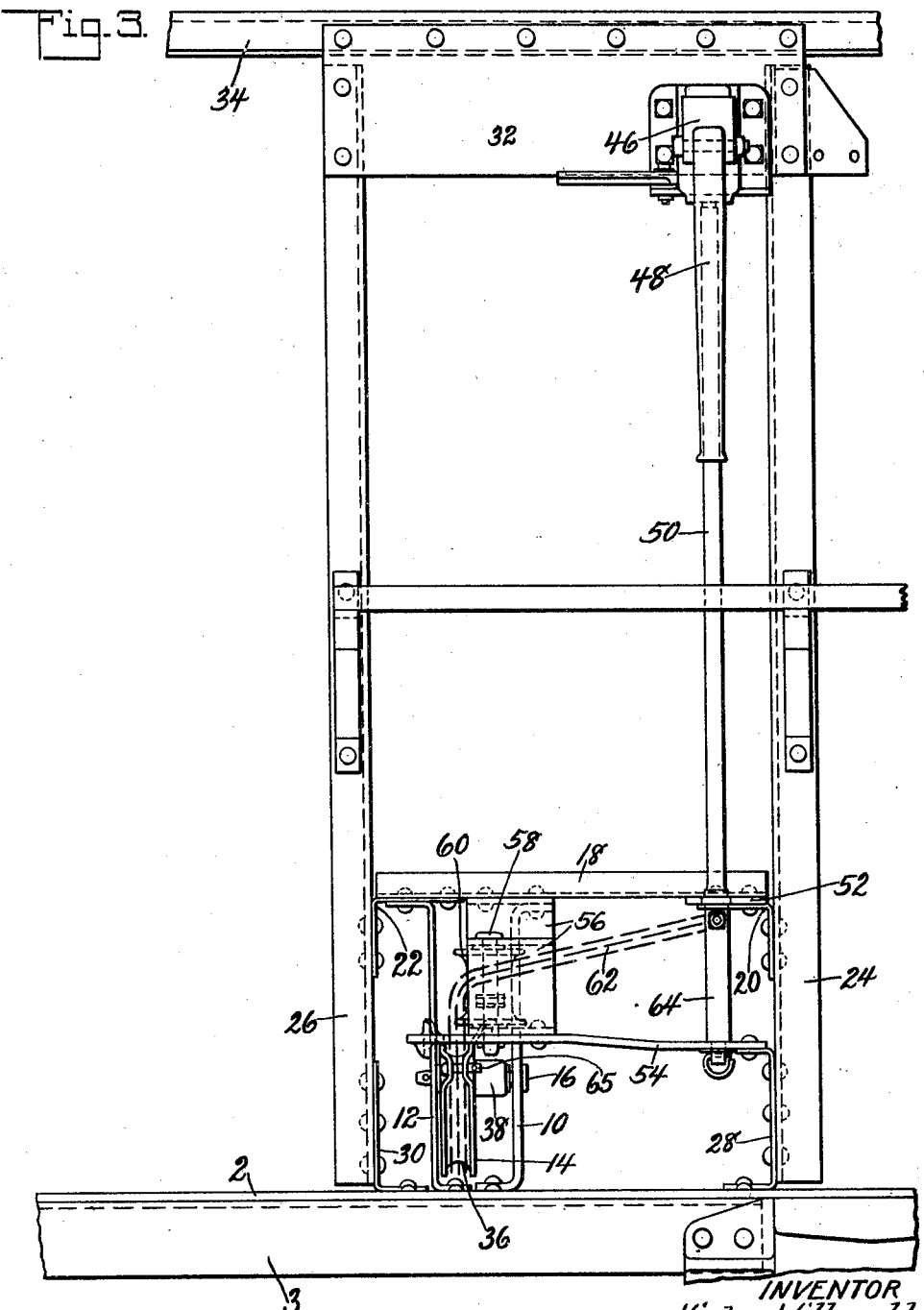

1,665,393

UNITED STATES PATENT OFFICE.

VICTOR WILLOUGHBY, OF RIDGEWOOD, NEW JERSEY, ASSIGNOR TO AMERICAN CAR AND FOUNDRY COMPANY, OF NEW YORK, N. Y., A CORPORATION OF NEW JERSEY.

BRAKE MECHANISM.

Application filed December 18, 1925. Serial No. 76,197.

This invention relates to brakes for railway cars and it is an object of this invention to provide a power multiplying device for use in connection with the hand brakes of cars which will be simple to construct and apply, reliable and efficient in service and which can be manufactured and applied at small cost both on new cars and cars now in service.

The accompanying drawings illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a broken partial vertical section taken on the line 1—1 of Fig. 2 of one end of a car and having the hand brake equipped with a power multiplying device constructed in accordance with this invention;

Fig. 2 is a partial horizontal section taken on the line 2—2 of Fig. 1, and

Fig. 3 is a partial end elevation of the car showing the hand brake and power multiplying device applied thereto.

In the drawings the power multiplying device is shown applied to a dumping car of the type in which the brake cylinder 1 is mounted upon a sheet or plate 2 which is carried upon the end sill 3, center sills 4 and bolster 5 at the end of the car. The air brake apparatus is of the usual construction comprising a push rod 6 which is pivotally connected to a brake lever 8, the brake lever being connected to the brake rigging in the usual manner. Secured to the plate 2 are the vertical members or standards 10 and 12 which serve to support a power multiplying device comprising a cam brake sheave 14 which is rotatably mounted upon a pin 16 which passes through openings in the members 10 and 12. The members 10 and 12 are provided with inwardly directed flanges at their lower ends by which they are secured to the plate 2 and with outwardly directed flanges at their upper ends by which they are secured to a channel member 18 which is secured at its ends by angle plates 20 and 22 to vertical members 24 and 26, respectively. It will be noted that the members 10, 12 and 18 and plates 2 form a frame for the support of the power multiplying device. The vertical members 24 and 26 are secured by angle plates 28 and 30, respectively, to the plate 2 and are connected together at their upper ends by a plate 32 which is secured to the angle 34 forming the top member of the sloping end of the car body. The cam brake sheave 14 comprises a grooved winding portion 36 of gradually increasing radius and a winding or hub portion 38 of uniform radius. Secured to the grooved portion 36 is a hook 39 which is in line with and which is connected by a chain or other flexible member 40 to a yoke 42 pivotally mounted on the pin 44 which connects the brake lever 8 to the push rod 6.

Secured to the plate 32 and to one side of the power multiplying device is a ratchet brake mechanism 46 having a brake operating lever 48 and a brake staff 50, the lower portion of the staff 50 being guided by being passed through an opening in a guide plate 52 secured to the cross channel member 18 and angle plate 20 and by having its lower end received in an opening in a brake staff step 54 which serves to support the shaft 50. The brake staff step 54 is secured at one end to an inwardly projecting flange formed on the upper end of angle plate 28 and has its other end bent inwardly and secured to the vertical member 12. Secured to the channel member 18 and the brake step 54 is a member 56 having a portion thereof of substantially U-shape and provided with openings to receive a pin 58 which passes through the openings in the member 56 and through an alined opening in the brake step 54. Rotatably mounted on the pin 58 is a guide roller 60 about which extends a chain 62 which has one end connected to the winding drum 64 of the brake staff and its other end connected at 65 to the point of greatest radius of the cam brake sheave, the adjacent portion of the chain 62 engaging the grooved portion 36 of the cam brake sheave.

In the operation of this device, rotation of the brake shaft 50 will cause the chain 62 to be wound about the winding drum 64 rotating the brake sheave 14 and rotating therewith the hook 39 causing the chain 40 to operate the brake lever 8 to apply the brakes in the usual manner, the brake staff step 54 serving as a strut between the brake staff and the power multiplying device. It will be noted that as the sheave 14 is rotated and the chain 62 unwound therefrom that it is first unwound from the portion of the sheave having the lesser diameter which provides for a more rapid movement of the hook 39 in taking up the slack in the chain 40 and that thereafter as the pressure is brought to bear upon the brakes the radius through which the chain 62 acts upon the brake sheave gradually increases and that the maximum radius is used with the full application of the brakes. It will also be noted that as the hook 39 descends, the chain 40 bears against the winding portion 38 and the radius of the portion 38 is thereafter the effective radius of the winding portion of the device.

What is claimed is:

1. In a car brake mechanism having a brake lever, a power multiplying device, a power transmitting connection between the brake lever and the power multiplying device, a brake staff mounted out-of-line with said device, a second power transmitting connection between said device and staff, a brake staff step, and direction changing means for said second power transmitting connection carried by said brake staff step.

2. In a car brake mechanism having a brake lever, a power multiplying device, means connecting said power multiplying device and said brake lever, a supporting frame for said power multiplying device, a brake staff mounted out-of-line with said device, a power transmitting connection between said device and staff, a brake staff step support forming a strut between said frame and staff and direction changing means for said power transmitting means carried by said support.

3. In combination, a car underframe, a plate carried by said underframe, a frame projecting upwardly from said plate, a power multiplying device pivotally mounted in said frame, said device comprising a means operatively connected to a brake lever and a cam brake sheave, a brake staff mounted out-of-line with said cam brake sheave, a brake staff step connected to said frame, a power transmitting connection between said staff and sheave and a direction changing means for said power transmitting means between the power multiplying device and the brake staff carried by said step.

4. In a car having an end sill, a plate mounted thereon and a brake mechanism supported by the plate, means for operating said brake mechanism comprising a frame secured to the plate, a cam brake sheave mounted in said frame, a step plate mounted on the frame, a supporting element secured to the step plate and to the beforementioned frame, a guide roller journaled in said supporting element and rotatable on a fixed axis above the sheave, a brake staff arranged out of line with said sheave and with its lower end supported by said step, a mounting for supporting the upper end of said staff, and a flexible connection between said sheave and brake staff and guided by said roller.

In witness whereof I have hereunto set my hand.

VICTOR WILLOUGHBY.